United States Patent [19]

Hardison et al.

[11] Patent Number: 5,126,297

[45] Date of Patent: Jun. 30, 1992

[54] METHOD OF MAKING A METAL PHTHALOCYANINE CATALYST

[75] Inventors: Leslie C. Hardison, Barrington; Edward J. Dowd, Palatine; Derek McManus, Roselle, all of Ill.

[73] Assignee: ARI Technologies, Inc., Palatine, Ill.

[21] Appl. No.: 612,624

[22] Filed: Nov. 13, 1990

Related U.S. Application Data

[63] Continuation-in-part of Ser. No. 396,031, Aug. 24, 1989, abandoned.

[51] Int. Cl.$^5$ .............................................. B01J 31/22
[52] U.S. Cl. ........................................ 502/62; 502/163
[58] Field of Search ................................... 502/62, 163

[56] References Cited

U.S. PATENT DOCUMENTS

| | | | |
|---|---|---|---|
| 2,988,500 | 6/1961 | Gleim et al. .................... | 502/163 X |
| 3,074,958 | 1/1963 | Fleysher et al. ................... | 540/139 |
| 3,108,081 | 10/1963 | Gleim et al. ......................... | 502/163 |
| 3,230,180 | 1/1966 | Larson ................................ | 502/163 |
| 4,088,569 | 5/1978 | Douglas ............................. | 208/206 |
| 4,248,694 | 2/1981 | Carlson et al. ..................... | 208/206 |
| 4,364,843 | 12/1982 | Carlson ............................. | 502/163 |

FOREIGN PATENT DOCUMENTS

| | | |
|---|---|---|
| 842222 | 5/1970 | Canada . |
| 1542520 | 3/1970 | Fed. Rep. of Germany ...... 502/163 |
| 246487 | 11/1969 | U.S.S.R. ............................ 502/163 |

*Primary Examiner*—Patrick P. Garvin
*Attorney, Agent, or Firm*—Marshall, O'Toole, Gerstein, Murray & Bicknell

[57] ABSTRACT

The in situ formation of a supported active metal phthalocyanine catalyst is disclosed. The supported metal phthalocyanine catalyst is useful in sweetening sour petroleum distillates containing mercaptans.

13 Claims, No Drawings

METHOD OF MAKING A METAL PHTHALOCYANINE CATALYST

CROSS-REFERENCE TO RELATED APPLICATION

This is a continuation-in-part of copending, commonly assigned application Ser. No. 07/396,031 filed Aug. 24, 1989 and now abandoned.

BACKGROUND OF THE INVENTION

1. Field of the Invention

This invention relates generally to catalytic sweetening of sour hydrocarbons and, more specifically, this invention relates to a method of making a supported metal phthalocyanine oxidation catalyst for oxidizing mercaptans in petroleum distillates.

2. Description of Related Technology

Processes for the treatment of sour petroleum distillates using oxidation catalysts in the presence of suitable oxidizing agents are widely practiced in the petroleum refining industry. These oxidation processes, generally referred to as distillate sweetening, are typically designed to oxidize undesired mercaptans into innocuous disulfides. A wide range of petroleum distillate products, including gasoline, naphtha, kerosene, jet fuel, fuel oil, and lubricating oil, may benefit by the catalytic oxidation of unwanted mercaptans.

An efficient system of oxidizing mercaptans in sour petroleum distillates includes the step of contacting the distillate with a metal chelate catalyst which is supported on a high surface area adsorptive material. Suitable metal chelates and supports include metal phthalocyanine compounds and activated charcoals, respectively. An alkaline agent and an oxidizing agent are typically present when using phthalocyanine catalysts. Generally, the oxidizing agent is air and the alkaline agent is aqueous caustic solution.

U.S. Pat. No. 2,988,500 (Jun. 13, 1961) to Gleim et al. describes a process of catalytically oxidizing petroleum distillates with a metal phthalocyanine catalyst composited on a carbon support. The preferred process treats the petroleum distillate with a an aqueous alkaline agent.

U.S. Pat. No. 3,108,081 (Oct. 22, 1963) to Gleim et al. describes the preparation of a catalytic composition of a support material and a phthalocyanine catalyst. The catalyst is preferably a sulfonated metal phthalocyanine compound deposited on an activated carbon support. The catalyst composition is prepared by soaking the support with an aqueous solution of the sulfonated metal phthalocyanine compound. The solution is usually alkaline, as alkalinity aids the solubility of the sulfonated phthalocyanine compound. Excess solution is removed and the composite is then dried. The alkaline solubility of sulfonated phthalocyanine compounds is problematic because the compounds are leached from the support when alkaline agents are used to treat the petroleum distillates during the oxidation process.

Gleim et al. U.S. Pat. No. 3,108,081 also describes forming the catalyst composition within the treating zone of a distillate reactor. However, the chemical structure of the sulfonated metal phthalocyanine catalyst is not modified by the composition formation, but rather is established before contact with the support.

U.S. Pat. No. 3,230,180 (Jan. 18, 1966) to Larson describes a method of preparing a metal phthalocyanine catalyst combined with or deposited on a solid adsorbent carrier material. The preparation involves depositing a metal oxide on the solid adsorbent and subsequently heating the deposited metal oxide with phthalonitrile at an elevated temperature of 175° to 325° C. The phthalonitrile may be heated with the metal oxide with or without the use of an inert organic solvent.

U.S. Pat. No. 4,248,694 (Feb. 3, 1981) to Carlson et al. describes a process of impregnating charcoal particles with an aqueous solution of a metal phthalocyanine and then wetting the impregnated charcoal with an aqueous metal hydroxide. The metal phthalocyanine is somewhat soluble in the alkaline wetting solution and is therefore susceptible to being leached from the charcoal. Any catalyst leached from the charcoal may be recycled, although it is desirable to introduce additional catalyst for adsorption on the charcoal support to compensate for loss of catalyst therefrom. Mixtures of cobalt phthalocyanine mono- and disulfonates are preferred catalysts. The chemical structure of the phthalocyanine catalyst is established before impregnating the support and is not chemically modified by the described catalyst preparation process.

U.S. Pat. No. 4,364,843 (Oct. 4, 1982) to Carlson describes a catalytic composite prepared from an alcoholic mixture containing less than 25 wt. % water, a metal chelate, an alkali metal hydroxide, and an adsorptive support. The mixture is preferably dried at a temperature of less than 30° C. Methanol containing less than 1 wt. % water is preferably used to form the alcoholic mixture. This procedure, therefore, requires, handling and removing quantities of flammable and costly solvents.

SUMMARY OF THE INVENTION

It is an object of the present invention to overcome one or more of the problems described above.

According to the invention, a supported metal phthalocyanine catalyst is prepared by impregnating a porous solid support material with a single aqueous solution of reactants which are selected to catalytically react to form a metal phthalocyanine reaction product in situ on the support material, and causing the reactants to react to form the metal phthalocyanine catalyst.

In a preferred embodiment of the invention, an aqueous solution containing stoichiometric amounts of an iron or cobalt salt, phthalic acid or a derivative thereof, and urea as well as an ammonium molybdate catalyst is uniformly sorbed onto an activated carbon support, the bulk of the water is removed, and the reactants are then catalytically reacted to form an iron or cobalt phthalocyanine catalyst Cobalt chloride is a particularly preferred metal salt.

Other objects and advantages of the invention will be apparent to those skilled in the art from a review of the following detailed description, taken in conjunction with the appended claims.

DETAILED DESCRIPTION OF THE INVENTION

According to the invention, an active catalytic metal phthalocyanine product useful in sweetening sour petroleum distillates under suitable oxidizing conditions may be prepared by impregnating a porous support material with a single aqueous solution of reactants which includes a suitable metal salt, phthalic acid or a phthalic acid derivative, urea and a catalyst, and heating the reactant impregnated support to yield a metal phthalocyanine catalyst The reactants are generally water soluble However, the metal phthalocyanine catalyst thus formed is not soluble in aqueous alkaline liquids to a substantial degree.

The various metal salts which may be used to form an active oxidation catalyst according to the invention include salts of the transition metals such as vanadium, chromium, manganese, iron, cobalt, nickel and copper. Salts of cobalt and iron are preferred, with cobalt chloride being highly preferred.

The phthalic acid derivative may be selected from a variety of substituted or unsubstituted derivatives, including sulfonates or carboxylates, which are commercially available and known to yield active metal phthalocyanine catalysts. Preferred phthalocyanine catalysts such as unsulfonated cobalt phthalocyanine are formed using phthalic acid or unsulfonated phthalic acid derivatives or mixtures thereof, which react with metal chlorides to yield metal phthalocyanines that are essentially insoluble in aqueous and caustic solutions. Phthalocyanine catalysts which are slightly soluble in aqueous or caustic solutions, such as sulfonate derivatives or partially sulfonated phthalocyanines, may also be used if such solubility may be tolerated. If desired, mixtures of phthalic acid and sulfonate derivatives such as 4-sulfophthalic acid may be used. As the degree of sulfonate substitution increases, however, solubility in aqueous and caustic solutions typically increases. For example, the relative order of solubility of substituted sulfonate phthalocyanine derivatives is mono- < di- < tri- < tetra-. Therefore, unsubstituted derivatives may be preferred to prevent leaching of the catalyst from the support. Although some leaching of the catalyst from the support may be encountered when slightly soluble phthalocyanine derivatives are used, the useful life of the catalyst may not be significantly shortened by a small loss of catalytic activity caused by leaching of substituted sulfonated derivatives.

The catalyst used to aid the formation of the metal phthalocyanine product may be selected from any well known catalyst. Boric acid or ammonium molybdate, for example, may facilitate the reaction of a metal salt with phthalic acid or a derivative thereof and urea. A preferred catalyst for use in aqueous solutions is ammonium molybdate.

The support material may be selected from any well known porous support material which provides a surface capable of being impregnated by the reactant mixture. Suitable supports include charcoals, activated carbon, clays, silicates and refractory inorganic oxides. The support must be stable under sweetening reaction conditions and be porous enough to allow for impregnation with about 0.1 to 15 wt. % of the catalyst relative to the weight of the support material. A particularly preferred support is porous activated carbon particles.

The inventive method may be carried out in a single vessel without the need to use hazardous, expensive or environmentally undesirable caustic and/or organic solvents. When impregnating activated carbon support materials, aqueous solutions are superior to organic solvents because when organic solvents are used to carry the water-insoluble metal phthalocyanines into the carbon support material, the organic solvents themselves are also strongly sorbed on the carbon support material surface. Sorption of the organic solvent by the carbon bed interferes with the deposition of the metal phthalocyanine catalyst, and factors such as the configuration of the carbon support material, the flow rate of the phthalocyanine solution through and within the support material, and the effective concentrations of the impregnating catalyst critically affect the formation of the resulting supported catalyst.

The use of aqueous solutions, in contrast to organic solutions, allows for uniform dispersal of reactants and more complete impregnation of the support material with the desired catalyst because the reactants may be more fully associated with the carbon support due to the relatively low polarity of both the reactants and the support material compared to the water of the aqueous reactant solution. In addition, the concentration of the reactants in the aqueous solution may be adjusted in order to provide a volume of solution selected to fill the accessible pores of the support material with amounts of reactants sufficient to provide effective or optimal catalytic activity for a given type of catalyst and support material. Thus, all of the reactants in the aqueous phase which contact the support may be completely sorbed and the pores contain a desired amount of the proper catalyst-forming reactants.

The metal phthalocyanine product is prepared by mixing the reactants, i.e. a suitable metal salt, phthalic acid or a phthalic acid derivative, urea, and a suitable catalyst in water to give a single aqueous reactant mixture. The concentrations of suitable reactants in the aqueous solution are selected to optimally yield the desired metal phthalocyanine catalyst. Based on the metal salt, essentially stoichiometric amounts of the metal and the phthalic acid or derivative as well as at least a stoichiometric amount of urea, and preferably an excess of urea, are catalytically reacted in the presence of ammonium molybdate to yield the metal phthalocyanine product. The stoichiometric ratios of the reactants may be empirically adjusted in view of recognized variations in the catalyst forming reaction, due to the use of different metals or phthalic acid derivatives, types of support, and specific reactor conditions. A preferred molar ratio of a metal salt to phthalic acid or a derivative thereof is about one mole of the metal salt to at least about four moles of the phthalic acid or derivative.

A similar process of preparing the metal phthalocyanine reaction product in organic solvents is disclosed in U.S. Pat. No. 3,074,958 (Jan. 22, 1963) to Fleysher et al. which describes the preparation of metal phthalocyanine in organic solvents from metal (II) salts, phthalic acid or derivatives thereof, urea or an equivalent thereof, and a suitable catalyst. The use of the reactants in an aqueous solvent, however, is preferred according to the invention because of the reduced handling risks and problems.

The reactant solution is combined with and allowed to impregnate the support material, and then heated to evaporate the bulk of the water from the aqueous solution. An amount of the reactant solution sufficient to fill the pores of porous support material is suitable and the use of an excess amount of the aqueous solution is not required.

Advantageously, deposition of the reactants on the solid support material is particularly efficient when activated carbon is used as the support material because of the greater affinity of the reactants for adsorption on the support surface relative to the affinity of the aqueous phase for the support material. Similarly, the reactants will be expected to be more uniformly dispersed and distributed on the support from an aqueous solution as compared to distribution from a hydrocarbon or others organic solution or a solution which has a greater affinity for the support surface compared to that of water.

After the water is evaporated, the dried mixture is baked in a furnace for a sufficient time, generally about 2 hours, at a sufficiently high temperature, e.g. about 260° C.) to form the active metal phthalocyanine product within the pores of the solid support material. Preferably, the dried mixture is baked under an inert atmosphere when activated carbon is used as the porous support material.

In the process of sweetening a sour petroleum distillate, it has generally been the practice to oxidize the mercaptans contained in the petroleum in the presence of an alkaline agent, such as an aqueous caustic solution. To practice the invention, a sour petroleum distillate is contacted with the catalytic metal phthalocyanine product under batch or continuous conditions. A continuous treating operation using a fixed bed of the catalytic metal phthalocyanine product is preferred. An oxidizing agent, preferably air, is introduced into contact with the distillate and the catalytic product to provide at least the stoichiometric amount of oxygen needed to oxidize the mercaptan content of the distillate.

It may be preferable in treating distillates with high mercaptan contents to initially contact the catalytic product with an alkaline agent prior to contacting the distillate with the catalyst.

The presence of an alkaline agent may be desired when treating petroleum distillates having extremely high concentrations of mercaptan compounds, especially high molecular weight mercaptan compounds. The activity of the catalytic product of the invention in the presence of an alkaline agent may not be substantially shortened during use, since alkaline leaching of the catalyst from the support is eliminated or minimized where the catalyst is unsulfonated or mono-sulfonated.

Typically, when using additional alkaline agents, the catalyst is initially saturated with an alkaline agent, and the alkaline agent is thereafter contacted with the catalytic bed, either continuously or intermittently, in admixture with the sour petroleum distillate. Any suitable alkaline agent may be employed. An alkali metal hydroxide in aqueous solution, such as sodium hydroxide in water, is most often employed. The alkaline solution may further comprise a solubilizer, such as an alcohol, preferably methanol, ethanol, n-propanol, isopropanol, phenols or cresols, to promote mercaptan solubility. The solubilizer, when employed, is preferably methanol, and the alkaline solution may suitably comprise from about 2 to 100 vol. % methanol.

Sodium hydroxide and potassium hydroxide typically constitute the preferred alkaline agents. Other alkaline agents such as lithium hydroxide may also be employed.

Sweetening of petroleum distillates may be carried out under known sweetening conditions. The process is usually effected under ambient temperature and pressure conditions. Higher temperatures (e.g. up to about 105° C.) may be used, if desired. Pressures of up to about 1000 psig or more are operable, although substantially atmospheric pressures are generally preferred. Contact times equivalent to a liquid hourly space velocity of from about 0.5 to 10 $hr^{-1}$ or more are effective to achieve a desired reduction in the mercaptan content of a sour petroleum distillate. Optimum contact time depends on the size of the treating zone, the quantity of catalyst used, and the character of the distillate being treated. One of ordinary skill in the art may readily empirically determine efficient ranges of operating parameters for a typical run.

Sweetening of the sour petroleum distillate is effected by oxidizing the mercaptan content of the distillate to disulfides. Accordingly, the process is effected in the presence of an oxidizing agent, preferably air, although oxygen or another oxygen-rich gas other than air may be employed. The sour petroleum distillate may contain sufficient entrained air, although air is preferably added to the distillate and also charged to the treating zone. In some cases, it may be advantageous to separately charge the air to the treating zone.

Since an unsulfonated metal phthalocyanine catalyst is substantially insoluble in water, and therefore unlikely to dissolve in the alkaline solution which is generally added to gasoline or other petroleum fraction, the metal phthalocyanine catalyst is highly stable, and would be expected to have a longer useful life than a counterpart highly sulfonated material.

In general, metal phthalocyanines having the lowest levels of sulfonation tend to produce the highest activity for mercaptan oxidation. Therefore, the supported unsulfonated catalysts of the invention exhibit superior activity and stability as compared to highly sulfonated phthalocyanine catalysts.

In a preferred form, the phthalocyanine catalyst is unsulfonated and is therefore substantially insoluble in aqueous alkaline solutions. Therefore, the catalyst is not leached from the support surface during use. However, the catalyst forming reactants are generally water soluble. Therefore, the invention allows the impregnation of a support with a metal phthalocyanine catalyst which is insoluble in aqueous solutions without the need to use costly and hard to handle organic solvents in the catalyst preparation procedure.

EXAMPLES

The following specific examples are given in order to illustrate the practice of a preferred embodiment of the invention, and are not to be construed to limit the scope of the invention.

EXAMPLE 1

Preparation of Unsulfonated Cobalt (II) Phthalocyanine

Cobalt (II) chloride hexahydrate (0.75 g), phthalic acid (2.09 g), urea (4.15 g), and a catalytic amount of ammonium molybdate (0.016 g) are mixed in water (3 ml). A sufficient amount of ammonia is added to ensure complete solubility in water by converting the phthalic acid reactant to its diammonium salt. The reactant mixture is combined with an amount of activated carbon to provide loadings of 0.1 to 15 wt. % of active catalyst on the activated carbon, heated on a hot plate to evaporate the bulk of the water, and baked in a furnace for about 2 hours at a temperature of about 260° C. The resulting supported reaction product is an intense blue color and is insoluble in water.

EXAMPLE 2

Preparation of Partially Mono-sulfonated Cobalt Phthalocyanine

Cobalt (II) chloride hexahydrate (0.75 g), phthalic acid (1.37 g), 4-sulfophthalic acid (1.35 g), urea (3.62 g) and a catalytic amount of ammonium molybdate (0.016 g) are mixed in water (3 ml). The reactant mixture is combined with an amount of activated carbon to provide about 0.1 to 15 wt. % of active catalyst on the activated carbon, heated on a hot plate to evaporate the bulk of the water, and baked in a furnace for about 2 hours at a temperature of about 260° C. The resulting supported reaction product is an intense blue color which is only slightly soluble in water.

The foregoing detailed description is given for clarity of understanding only, and no unnecessary limitations should be understood therefrom, as modifications within the scope of the invention will be obvious to those skilled in the art.

We claim:

1. A method of making a supported metal phthalocyanine oxidation catalyst, comprising the steps of:
   (a) impregnating a porous solid support material with a single aqueous solution of reactants selected to catalytically react to form a metal phthalocyanine reaction product including a metal salt, said solution being present in an amount sufficient to uniformly disperse the reactants throughout said support material and said reactants being present in said solution in at least a stoichiometric ratio with respect to said metal salt;
   (b) reacting said reactants under catalytic reaction conditions to form said metal phthalocyanine reaction product in situ in a uniform dispersion on and within said support material.

2. The method of claim 1 wherein said reactants are reacted to form said metal phthalocyanine product by removing the bulk of the water from said solution in said impregnated support and heating at an elevated temperature for a time sufficient to form said metal phthalocyanine product.

3. The method of claim 2 wherein said elevated temperature is about 260° C.

4. The method of claim 1 wherein said support material is selected from the group consisting of activated carbon, charcoals, clays, silicates and refractory inorganic oxides.

5. The method of claim 4 wherein said support material comprises activated carbon.

6. The method of claim 4 wherein said metal phthalocyanine is selected from cobalt phthalocyanine and iron phthalocyanine.

7. The method of claim 1 wherein said said reactants comprise an iron or cobalt salt, phthalic acid or a derivative thereof, urea, and a catalyst selected from the group consisting of ammonium molybdate and boric acid.

8. The method of claim 7 wherein the molar ratio of said iron or cobalt metal salt to phthalic acid or derivative thereof is about 1 to at least about 4, respectively.

9. The method of claim 7 wherein said metal salt is cobalt (II) chloride.

10. The method of claim 9 wherein said cobalt (II) chloride is a hexahydrate and said phthalic acid or a derivative thereof is selected from the group consisting of phthalic acid and mixtures of phthalic acid and 4-sulfophthalic acid.

11. The method of claim 9 wherein said phthalic acid is unsulfonated.

12. The method of claim 1 wherein said catalytic reactant product comprises about 0.1 to 15 wt. % of said support material.

13. The method of claim 1 wherein the accessible pores of said support material are substantially filled by impregnation with said solution prior to step (b).

* * * * *